United States Patent
Buckley et al.

(10) Patent No.: US 8,412,192 B2
(45) Date of Patent: Apr. 2, 2013

(54) APPARATUS, AND ASSOCIATED METHOD, FOR PROVIDING AN INSTANCE IDENTIFIER TO A NETWORK DATABASE NODE OF A MOBILE NETWORK

(75) Inventors: Adrian Buckley, Tracy, CA (US); Andrew Allen, Mundelein, IL (US)

(73) Assignee: Research In Motion Limited, Waterloo (CA)

( * ) Notice: Subject to any disclaimer, the term of this patent is extended or adjusted under 35 U.S.C. 154(b) by 602 days.

(21) Appl. No.: 11/621,023

(22) Filed: Jan. 8, 2007

(65) Prior Publication Data

US 2008/0167035 A1    Jul. 10, 2008

(51) Int. Cl.
*H04W 4/00* (2009.01)
(52) U.S. Cl. .............. 455/435.1; 455/411; 455/432.1; 455/433
(58) Field of Classification Search .......... 455/1–435.2; 370/310; 707/1, 100, 104.1
See application file for complete search history.

(56) References Cited

U.S. PATENT DOCUMENTS

| | | | |
|---|---|---|---|
| 2003/0233461 A1* | 12/2003 | Mariblanca-Nieves et al. | 709/228 |
| 2004/0268142 A1* | 12/2004 | Karjala et al. | 713/200 |
| 2005/0155036 A1* | 7/2005 | Tiainen et al. | 719/310 |
| 2006/0161512 A1* | 7/2006 | Schaedler et al. | 707/1 |
| 2007/0104207 A1* | 5/2007 | Noldus | 370/397 |
| 2007/0243876 A1* | 10/2007 | Duan | 455/445 |

FOREIGN PATENT DOCUMENTS

EP    1737192 A1    12/2006

OTHER PUBLICATIONS

C. Jennings, "Instance Identifiers for SIP User Agents", draft-jennings-sipping-instance-id-01.txt, Sipping WG, Internet-Draft, Jul. 13, 2005. XP15040577.

* cited by examiner

*Primary Examiner* — George Eng
*Assistant Examiner* — Marcus Hammonds

(57) ABSTRACT

Apparatus, and an associated method, for an IMS (IP multimedia subsystem) mobile network to transfer an IMEI or IMEISV to an equipment ID register. A SIP, or other IP-based, message including the IMEI or IMEISV of a user equipment is converted by a protocol converter embodied at an application server into a MAP or DIAMETER message. A forwarder forwards on the MAP or DIAMETER message to EIR.

18 Claims, 4 Drawing Sheets

APPARATUS, AND ASSOCIATED METHOD, FOR PROVIDING AN INSTANCE IDENTIFIER TO A NETWORK DATABASE NODE OF A MOBILE NETWORK

The present invention relates generally to a manner by which to access a network database node, such as an equipment identity register (EIR), in an IMS (IP Multimedia Subsystem) mobile network. More particularly, the present invention relates to apparatus, and an associated method, by which to forward on an instance identifier, such as the IMEI (International Mobile Equipment Identifier) or IMEISV (International Mobile Equipment Identifier Software Version), of an ME (Mobile Equipment) to the network database node.

A SIP-formatted registration, or other, message containing the instance identity is converted into a MAP or DIAMETER, or other, format so that the instance identifier can be delivered to the EIR. EIR related operations can thereby be provided to an IMS network that uses an IP-based format rather than a MAP format.

BACKGROUND OF THE INVENTION

The use of radio communication systems through which to communicate is pervasive throughout modern society. In a radio communication system, at least part of the communication path that extends between a set of communication stations is defined upon a radio link. A radio link is defined upon the electromagnetic spectrum and, because a wireline connection is not required, use of the radio link frees the communications stations from the need for the wireline connection. As a result, improved communication mobility is provided. And, the use of a radio link permits communication stations to be positioned and used at locations at which wireline connections would be impractical.

A cellular communication system is an exemplary type of radio communication system and whose use is widespread throughout the world. Early-generation systems were used primarily for voice communication services and provided limited data services. Newer-generation, cellular communication systems provide for increasingly data-intensive data communication services. A user communicates in a cellular communication system through use, typically, of a mobile station that is placeable in communication connectivity with a network part of the communication system by way of a radio air interface.

Early-generation systems primarily relied upon circuit-switched communication techniques in which circuit-switched connections are provided for the effectuation of communications between communication stations of the communication system. With the development and deployment of digital communication techniques, increasingly, provision is made for packet-switched communication connections to provide for packet-based communications between the communication stations. With continued evolution towards packet-switched communications, proposals have been set forth for packet-based communication networks and schemes. An IMS (IP Multimedia Subsystem) is a 3GPP (Third Generation Partnership Project) and 3GPP2 (Third Generation Partnership Project 2) effort towards the definition of an all-IP (Internet Protocol)-based wireless network, intended to provide voice, data, signaling, and control communications and functionality.

Circuit-switched, cellular communication systems, however, sometimes provide the capability of transferring the identity of mobile equipment, i.e., a mobile station, to a database to permit checking to be performed thereon. The identity of the mobile equipment is expressed, e.g., in terms of an IMEI (International Mobile Equipment Identity) value. Alternatively another Identity the IMEISV (International Mobile Equipment Identifier Software Version) can be used which includes the IMEI and also the software version of the equipment. The IMEI can be derived from the IMEISV. An operator of the cellular communication system is able, through a check, or other analysis made at, or in conjunction with, the database, to ascertain various information. An operator is able to determine, e.g., if the mobile equipment has been stolen, operates using unstable software, or any of various other information. For instance, the operator is further able to determine the capabilities of the mobile equipment.

A corresponding capability is not presently available in a system that is IMS-based that does not use cellular packet data systems like GPRS for access (e.g. a WLAN access system). That is to say, unlike a typical, circuit-switched system or one using GPRS, when a user, using a mobile equipment, accesses an IMS network, an operator of the system is unable correspondingly easily to obtain the same information about the mobile equipment.

An IMS network architecture is, in general, access-independent. The access technology used to transport messages, e.g., SIP (Session Initiation Protocol) messages, does not impact the functionality of the IMS network. In at least one existing, cellular communication system, the network database used by a system operator available for checking on information about the mobile equipment is an equipment identity register (EIR). In existing schemes, there simply is no defined way for the operator to provide for corresponding checking of the EIR, or an equivalent database node.

It is in light of this background information related to communications in an IMS-based, or other, cellular communication system that the significant improvements of the present invention have evolved.

DETAILED DESCRIPTION

Figure 1:
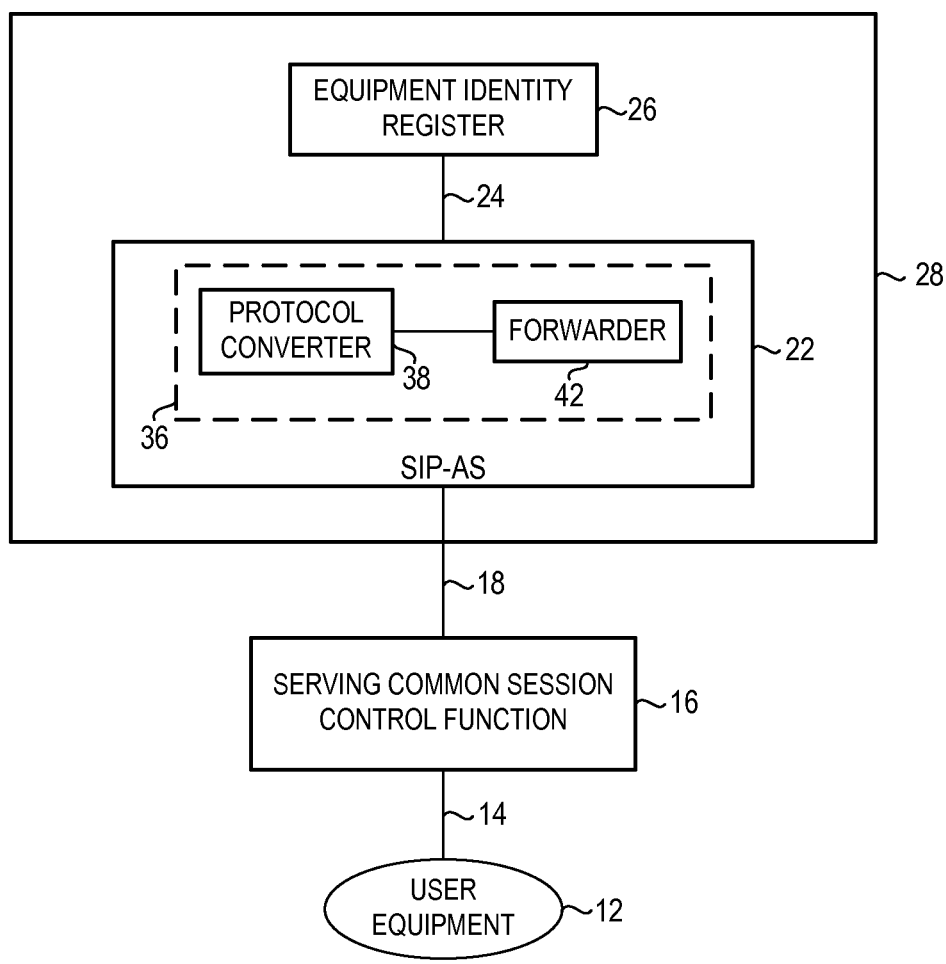
FIG. 1 illustrates a functional block diagram of the architecture of parts of a cellular radio communication system in which an embodiment of the present invention is operable.

The present invention, accordingly, advantageously provides apparatus, and an associated method, by which to access a network database node, such as an equipment identity register (EIR), in an IMS (IP Multimedia Subsystem) mobile network.

Through operation of an embodiment of the present invention, a manner is provided by which to forward on an instance identifier, such as the IMEI (International Mobile Equipment Identity) or IMEISV (International Mobile Equipment Identifier Software Version) of an ME (Mobile Equipment) to the network database node.

In one aspect of the present invention, a SIP-formatted registration message, or other message, containing the instance identifier is converted into an MAP (Mobile Application Part), or DIAMETER or other, format. By converting the SIP-formatted message of the instance identifier, into the MAP-formatted or DIAMETER formatted message, the instance identifier is routable to the EIR. The conversion is carried out automatically, and once converted, the instance identifier is forwarded to the EIR.

Once delivered to the EIR, EIR-related operations are provided. A check of the capabilities of the associated mobile equipment, a determination of whether the ME is valid, or, conversely, stolen, the type of software resident at the associated mobile equipment is all discernible, determinable, or otherwise able to be checked at the EIR. The EIR-related operations are thereby provided to an IMS network that uses an IP-based format rather than an MAP or DIAMETER format.

In another aspect of the present invention, the instance identifier comprises an IMEI (International Mobile Equipment Identifier), an IMEI-SV (International Mobile Equipment Identifier-Software Version), an ESN ( ), an MAC (Medium Access Control) address, or other identifier. The instance identifier is communicated by the mobile equipment to the IMS, mobile network pursuant to a mobility-related event. The mobility-related event comprises, for instance, registration of the mobile equipment, a session origination by the mobile equipment, a session termination to the mobile equipment, a mid session occurrence, an SMS (Short Message Service) origination by the mobile equipment, an SMS termination to the mobile equipment, or other event.

In another aspect of the present invention, the instance identifier, communicated, e.g., by the mobile equipment, by way of a radio air interface, is delivered to the IMS mobile network and then routed through a CSCF (Common Session Control Function) to a functional entity that converts the first-formatted instance identifier, e.g., in SIP form, into a second-formatted instance identifier, e.g., in MAP format or DIAMETER format. And, a MAP- or DIAMETER formatted message including the instance identifier is routed onto the network database node, such as the EIR. A forwarder operates to forward on the MAP-formatted or DIAMETER formatted message to the network database node.

In another aspect of the present invention, a protocol converter is embodied at an application server and is configured to receive the instance identifier in a message formatted pursuant to the first protocol, such as the SIP. The protocol converter converts the message containing the instance identifier into a second format, such as MAP or DIAMETER. And a forwarder is also embodied at the application server that functions to forward on the instance identifier, once formatted in the second-formatted message. The application server forwards the second-formatted message that is routed to the EIR. The database of the EIR performs analysis, and a message is returned to the application server. The application server performs further action, such as to allow an operation, disallow an operation, or perform a trace.

In another aspect of the present invention, the IMEISV is received in a SIP Register request or other SIP message from the mobile equipment and the IMEI is derived from the IMEISV before forwarding to the EIR or before checking by the EIR.

Thereby, a manner is provided for an IMS-based system for easy access to an EIR, or other network database node, to permit operations to be performed with respect to the EIR.

In these and other aspects, therefore, apparatus, and an associated method, is provided for facilitating access to a network database node in an Internet Multimedia Subsystem (IMS) mobile network. A protocol converter is adapted to receive a first indication of an instance identifier, formatted pursuant to a first protocol. The protocol converter is configured to convert the indication of the instance identifier into a second indication of the instance identifier formatted pursuant to a second protocol. A forwarder is configured to forward the second indication of the instance identifier, formatted pursuant to the second protocol on to the network database node.

Referring first, therefore, to FIG. 1, portions of a cellular communication system, shown generally at 10, provide for radio communications with a mobile equipment (ME), here identified as user equipment (UE) 12. A communication link 14, formed in part by way of a radio air interface, extends between the user equipment and the network part of the communication system. In the exemplary implementation, the communication system is formed, at least in part, of an IMS (IP Multimedia Subsystem), mobile network. More generally, the communication system is representative of other types of communication systems, including other IP (Internet Protocol)-based networks. Here, the communication link extends between the user equipment 12 and an S-CSCF (Serving-Common Session Control Function) 16. The S-CSCF is an IMS network-defined entity that performs various functions, such as registration of the user equipment, and to provide service to the user equipment. The S-CSCF further provides routing and translation functions, provides billing information to mediation systems, maintains session timers, and makes interrogation to a home subscriber server (not shown in FIG. 1) pursuant to authorization, service triggering, and profile-related operations.

The S-CSCF 16 is, in turn, here by way of the link 18, connected to another IP-based entity, a SIP-AS (Session Initiation Protocol-Application Server) 22. The SIP-AS performs conventional SIP-related services and functions, signal routing, etc. The application server, in turn, is connected, here by way of the communication link 26, to an Equipment Identity Register (EIR) 26. The EIR 26 is exemplary, and representative, of a network database node having database entries indexed, e.g., together with an instance identifier of user equipment, such as the IMEI, IMEISV, ESN, or MAC address of the user equipment etc. Here, the EIR is accessible and communication therewith is possible in conformity with a 3GPP MAP format, such as that defined more fully in TS 29.002. or a future format based on DIAMETER The application server 22 and the equipment identity register are represented as separate entities. In one implementation, and as indicated by the block 28, the entities are together embodied at a common platform.

In exemplary operation, the user equipment 12 registers, or otherwise sends a message by way of the communication link 14 to the S-CSCF 16. An instance identifier is included in the message that the UE sends, either of its own initiation or responsive to other initiation. The instance identifier identifies the UE and here forms, e.g., the IMEI or the IMEISV etc of the user equipment. As the message, in the IMS, mobile network is an IP-based message, here a SIP message, the instance identifier contained therein is not immediately routable on the EIR for database access and processing operations thereon.

Pursuant to an embodiment of the present invention, the application server includes apparatus, shown generally at 36, of an embodiment of the present invention. The apparatus 36 is formed of functional entities, implementable in any desired manner, including, for instance by algorithms executable by processing circuitry. Here, the entities include a protocol converter 38 and a forwarder 42. When a SIP, or other IP-based, message containing an instance identifier is routed, by way of the S-CSCF to the application server, the instance identifier, or an indication thereof, is provided to the protocol converter. The protocol converter operates to convert the IP-based instance identifier into a MAP format or DIAMETER format. And, once converted, the instance identifier is provided to the forwarder 42, and the message is forwarded on to the equipment identity register. And, once received, conventional operation of the EIR is permitted. Thereby, through operation of the apparatus, the SIP application server that receives the IMEI or IMEI-SV (or MIN or MAC address, etc.) forwards on the instance identifier using an MAP-formatted or DIAMETER formatted message. Subsequent operation of the EIR provides a response. The instance identifier is provided pursuant to registration, session origination, session termination, during mid session, an SMS origination, or an SMS termination. The SIP-based, or other IP-based, message containing the instance identifier is reported, in MAP form or DIAMETER form, to the EIR or via an intermediate node to the EIR e.g. HSS, SIP AS etc. Operation of the EIR decides, for instance, if the associated session or registration should be permitted, permitted with monitoring, permitted for a selected time period, or disallowed. Other actions of the EIR are, of course, also possible.

Figure 2:
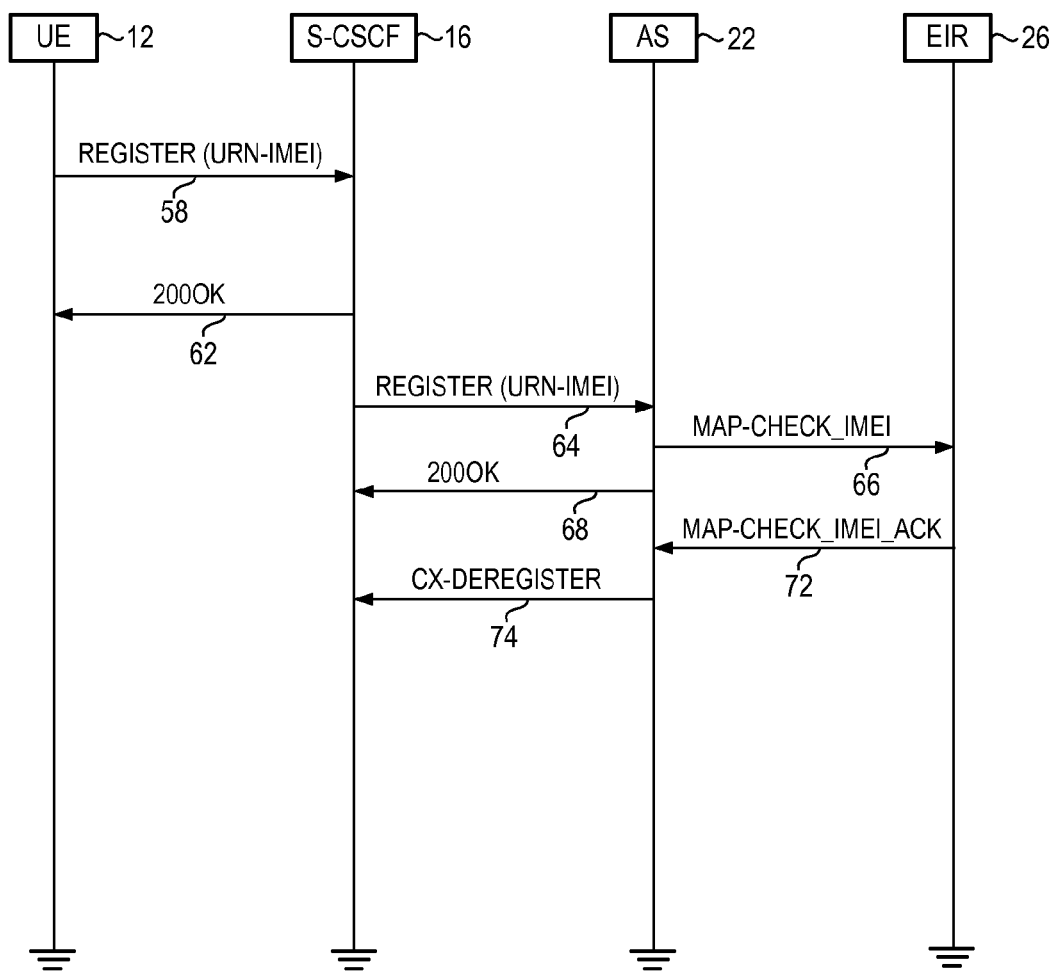
FIG. 2 illustrates a message sequence diagram representative of exemplary signaling generated during operation of an embodiment of the present invention.

FIG. 2 illustrates a message sequence diagram, shown generally at 52, representative of exemplary signaling generated during operation of the communication system, shown in FIG. 1, during operation of an embodiment of the present invention. Signaling between the user equipment 12, the S-CSCF 16, the application server (AS) 22, and the EIR 26 is shown.

A registration message including the IMEI or IMEISV of the user equipment is sent, indicated by the segment 58 by the user equipment and delivered to the S-CSCF. A 200Ok message 62 is returned to the user equipment. The S-CSCF, in turn, sends a register message, indicated by the segment 64, to the application server 22. This causes the Application Server to return a SIP 200Ok to the SIP Register message and then Subscribe to the Registration Event Package at the S-CSCF using a SIP SUBSCRIBE message. The S-CSCF responds with a SIP 200Ok to the SIP SUBSCRIBE message and to send a SIP NOTIFY message to the Application Server which contains the IMEI or IMEISV. In an alternate embodiment, the register message does not contain the IMEI or IMEI-SV value, in contrast to the message shown in FIG. 2. In this alternate implementation, a subscription to the Registration event package RFC 3680 is used upon receiving the $3^{rd}$ party register message to obtain the IMEI/IMEISV in the Instance ID of the contact. Protocol conversion is performed, and possibly the IMEI is derived from the IMEISV and the IMEI and/or IMEISV is forwarded on in a MAP message, here an MAP check IMEI message or IMEISV check message, indicated by the segment 66. A 200Ok message is returned by the application server to the S-CSCF 16, indicated by the segment 68. An acknowledgment message, indicated by the segment 72, is returned by the EIR to the application server. And, a Cx Deregister message, indicated by the segment 74, is returned to the S-CSCF.

That is to say, upon receiving a SIP registration, and if third party registration has been set up as part of filter criteria, the registration is sent to the application server. The "to header" part contains a non-barred, public user identity belonging to the service profile criteria. The identity is, e.g., a public user identity as contained in the register request received from the user equipment or an implicitly-registered public user identity in the service profile, as configured by an operator of the communication system. In addition, the instance identifier is also sent to the SIP application server in the SIP NOTIFY sent as a result of the subscription to the registration event package. The instance identifier is, e.g., the IMEI, the IMEISV, or another identifier that uniquely identifies the equipment characteristics. The characteristics include, for instance, the manufacturer of the user equipment, its country of origin, its software load, the software version of the load, the hardware load, the hardware version of the load, etc.

The S-CSCF receives the 200Ok message back from the application server. The S-CSCF further receives, the network deregistration message, indicated by the segment 74. If a network deregistration is provided, the profile for that AOR received in the deregistration, and all of the associated other public users' identifiers with the AOR are deleted.

Figure 3:
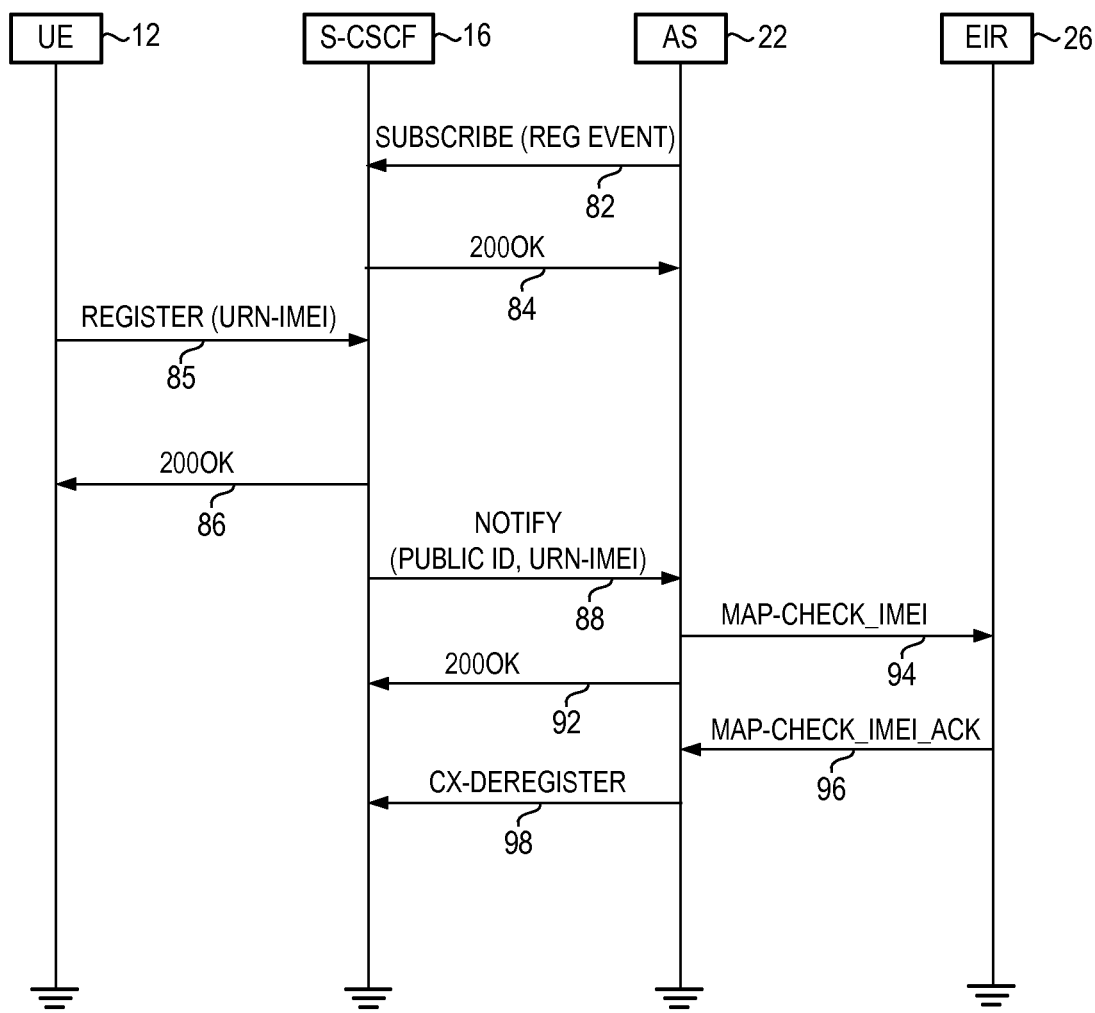
FIG. 3 illustrates another message sequence diagram, similar to that shown in FIG. 2, but here representative of signaling generated during alternate operation of an embodiment of the present invention.

FIG. 3 illustrates a message sequence diagram, shown generally at 76, again representative of signaling between the user equipment, the S-CSCF 16, the application server 22, and the EIR 26. Here, signaling representative of a registration event is shown. A subscriber message, indicated by the segment 82, is provided by the application server to the S-CSCF. And, a 200Ok message, indicated by the segment 84, is returned. A register message, including the IMEI or IMEISV of the user equipment 12 is sent by the user equipment, indicated by the segment 85, to the S-CSCF. And a 200Ok message, indicated by the segment 86, is returned to the user equipment.

A notify message containing the IMEI or IMEISV, indicated by the segment 88, is provided by the S-CSCF to the application server. A 200Ok message is returned, in response, indicated by the segment 92. Protocol conversion and possibly derivation of the IMEI from the IMEISV is performed at the application server, and a MAP message, indicated by the segment 94, is generated. The MAP message is a check IMEI message. The EIR responds with a MAP message, represented by the segment 96, to acknowledge its receipt. Here, a deregister message, indicated by the segment 98, is returned by the application server to the S-CSCF.

Upon receiving a SIP registration, and if the application has subscribed to the registration event package, the S-CSCF sends the SIP REG event with the state and reason for change. The S-CSCF receives a 200Ok message back from the application server. The S-CSCF is here further shown to receive the subsequent network deregistration message, indicated by the segment 98.

Figure 4:
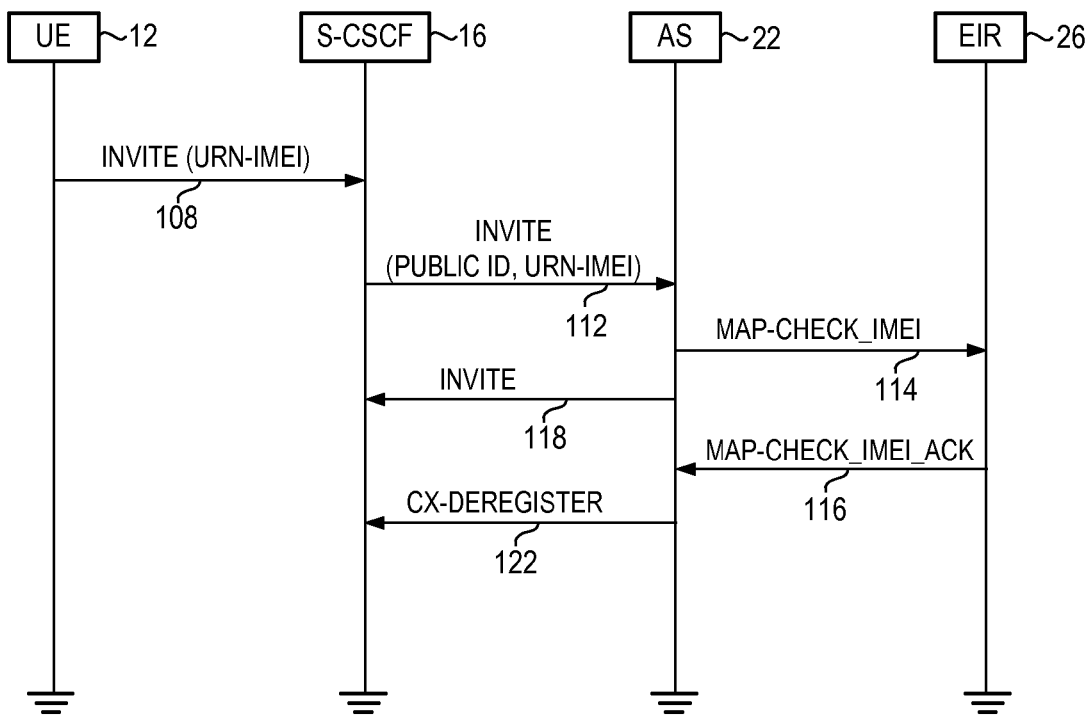
FIG. 4 illustrates a message sequence diagram, similar to those shown in FIGS. 2 and 3, but here representative of exemplary signaling generated during further alternate operation of an embodiment of the present invention.

FIG. 4 illustrates a message sequence diagram, shown generally at 106, representative of signaling, again between the elements 12, 16, 22, and 26. Here, signaling is representative of a scenario in which the application server 22 acts as a proxy or a B2BUA. Here, again, the user equipment provides its IMEI or IMEISV to the S-CSCF, here in an Invite message, indicated by the segment 108. The S-CSCF sends the Invite, indicated by the segment 112, to the application server. Protocol conversion is performed at the application server and a MAP message, indicated by the segment 114, is forwarded to the EIR 26. The MAP message forms a Check IMEI message. A MAP response message, indicated by the segment 116, is returned to the application server. The MAP message forms a Check IMEI acknowledge message. An Invite message, indicated by the segment 118, is also sent by the application server to the S-CSCF. And, a deregister message, indicated by the segment 122, is also returned by the application server to the S-CSCF.

Here, upon receiving a SIP message that forms the start of a dialog, the message is sent to the application server. The S-CSCF subsequently receives, e.g., a network deregistration, indicated by the segment 122. If a network deregistration is received, the profile for that AOR received in the deregistration and all of the associated other public user IDs with that AOR are deleted.

The application server contains information when the instance identifier, e.g., the IMEI, IMEI-SV, ESN (Equipment Security Number), etc. should be checked. This information is, e.g., preconfigured. Checking includes, for instance, checking upon receipt of the registration, upon receipt of an Invite message that is mobile-originated, or upon receipt of an Invite message that is mobile-terminated. Upon receipt of a SIP message, e.g., a registration message, an Invite message, etc., by way of the S-CSCF, the application server then acts to check to see if an instance identifier is received as part of the message. Copending patent applications of the assignee of application Ser. Nos. 11/416,465 filed on May 2, 2006 and Ser. No. 11/503,465 filed on Aug. 11, 2006 describe how an IMEI may be included in a GRUU in an INVITE. If an instance identifier is received, the identifier is sent, using an appropriate protocol, to another network node or functional entity, to determine the status of the user equipment associated with the identifier. Protocol conversion is performed, to form a 3GPP MAP, a 3GPP2 MAP, or DIAMETER, or another SIP message. In this manner, the application server acts analogous to an MSC/SGSN of a circuit-switched network, and the application server acts to ensure that the received instance ID is contained in the received message and causes construction of a MAP Check IMEI message/MAP Check IMEISV mess. The message contains the IMEI or IMESV that is received as part of the SIP register message. The message takes that format specified, e.g., in TS 29.002. If the received instance ID is not an IMEI or IMEISV, or equivalent, and the application server supports other protocols the application server determines which other protocol to be used based on the received instance ID type. The application server receives a MAP acknowledge message back from the EIR containing a response to the check message. The application server behavior, in response thereto, permits the operation to proceed, causes the operation to be terminated, or causes the operation to be traced.

In third-party registration procedures, upon receiving a SIP registration, the application server sends a 200Ok message back to the S-CSCF and then subsequently checks to see if an instance ID has been included in the message. If so, the application server checks to see what action should be taken. Alternatively the Application Server upon receiving the third-party registration from the S-CSCF can obtain the instance ID by subscribing to the Registration Event package. If a policy has been configured that the instance ID should be checked, the application server constructs an outbound protocol PDU (Packet Data Unit) that is specific to the received, incoming instance ID coding, e.g., 3GPP MAP Check IMEI or MAP Check IMEISV. The IMEI or IMEISV parameter is, e.g., encoded as a URN contained in the instance ID. The application server, in this instance, acts analogous to a call service control function and waits for the acknowledgement. The acknowledgment shall provide one of three responses, such as the responses just-noted. If the operation is allowed to proceed, i.e., is white listed, and the application server need not perform additional operations. If the operation is to be terminated, i.e., is black listed, the application server sends a SIP deregistration message to the S-CSCF for the received AOR.

Pursuant to registration event procedures, upon reception of a SIP notify message, the application server checks to see if an instance ID has been included with the received AOR for the registration event. A 200Ok is sent back to the node that has sent the SIP notify. If so, the application server checks to see what action should be taken. If policy has been configured such that the instance ID should be checked, the application server constructs an outbound protocol PDU that is specific to the received, incoming instance ID coding, e.g., a MAP or DIAMETER message. The IMEI or IMEISV parameter is encoded as a URN contained in the instance ID. The application server acts analogous to a call/service control function and awaits an acknowledgment. The acknowledgment provides one of three responses, also as just-described. If the operation allowed to proceed, the application server need not perform additional operations. If the application is to be terminated, a deregistration message is sent to the S-CSCF for the received AOR.

When the application server acts as a proxy, or a B2BUA, upon receipt of a set message, e.g., a registration message, an incoming Invite message, an outgoing Invite message, etc., the application server checks to see if an instance ID has been included with received AOR.

If an Invite message is received, the application server checks to see what action should be taken. If a policy has been configured such that the instance identifier shall be checked, the application server constructs an outbound protocol PDU that is specific to the received, incoming instance identifier coding, e.g., a MAP or DIAMETER message. The IMEI or IMEISV parameter is encoded as a URN contained in the instance identifier. The application server acts, again, analogous to a call/service control function and awaits an acknowledgement. The acknowledgement provides one of the three just-mentioned responses. If the operation is permitted to proceed, the application server need not perform additional operations. If the operation is to be terminated, the SIP dialogue using an appropriate SIP procedure is carried out. If the operation is to be traced, the application server traces the SIP dialogue, meaning that the application server shall keep a record of all SIP messages associated with the dialogue and achieve them for use at a later date.

Figure 5:
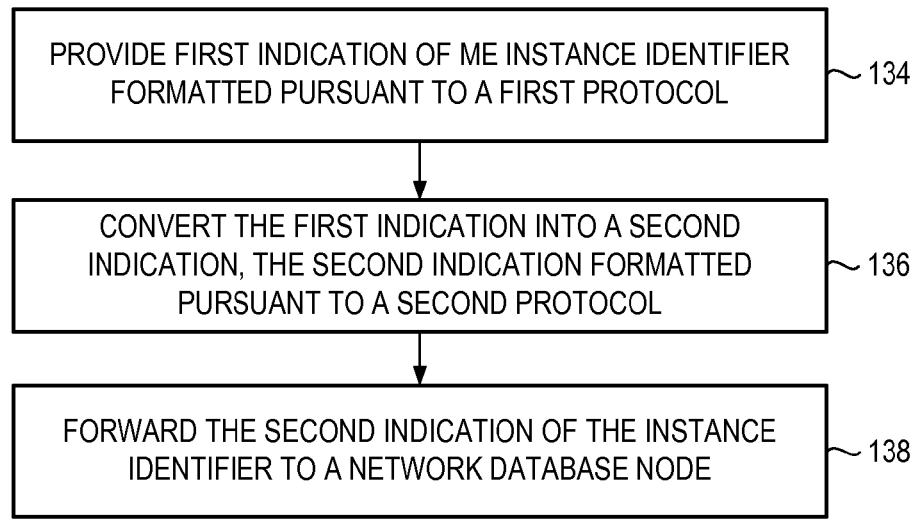
FIG. 5 illustrates a method flow diagram representative of the method of operation of an embodiment of the present invention.

FIG. 5 illustrates a method flow diagram, shown generally at 132, representative of the method of operation of an embodiment of the present invention. The method 132 facilitates access to a network data base node in an IMS mobile network.

First, and as indicated by the block 134, a first indication of an instance identifier is provided pursuant to a mobility related event. The instance identifier is formatted pursuant to a first protocol. Then, and as indicated by the block 136, the first indication of the instance identifier, formatted pursuant to the first protocol, is converted into a second indication of the instance identifier. The second instance identifier is formatted pursuant to a second protocol.

Then, and as indicated by the block 138, the second indication of the instance identifier is forwarded onto the network database node whereat further operation is carried out.

What is claimed is:

1. Apparatus for an Internet Protocol Multimedia Subsystem (IMS) mobile network application server for facilitating access to a network database node in an IMS mobile network by a user equipment (UE) device that is in connectivity with an access network, said apparatus comprising:

a serving control that receives a UE-originated message formatted pursuant to a first protocol, the UE-originated message including a first-instance identifier that uniquely identifies the UE;

an application server, coupled to said serving control to receive a mobility-related event message pursuant to a mobility related event including the first-instance identifier in the first protocol message from said serving control, said application server for determining if a preconfigured information requires a UE check for the mobility related event and for determining if the first-instance identifier is included in the first protocol message, wherein, when the UE check is required and the first instance identifier is included in the first protocol message, said application server initiates the UE check with an Equipment Identity Register (EIR) said application server further including a protocol converter embodied at the IMS mobile network application server adapted to receive said mobility-related event message including the first instance identifier in the first protocol, said protocol converter configured to convert the first-instance identifier included in the mobility-related event -message into a second-instance identifier formatted pursuant to a second protocol, the second-instance identifier comprising the first-instance identifier encoded as a uniform resource name; and a forwarder embodied at the IMS mobile network application server configured to forward the second-instance identifier on to the EIR whereby the EIR decides whether the mobility-related event is to be permitted.

2. The apparatus of claim 1 wherein the first-instance identifier, the first indication of which is received by said protocol converter, comprises a value of an International Mobile Equipment Identity (IMEI).

3. The apparatus of claim 1 wherein the first-instance identifier is provided to said protocol converter pursuant to a registration event.

4. The apparatus of claim 1 wherein the first protocol pursuant to which the first-instance identifier is formatted, comprises a Session Initiation Protocol.

5. The apparatus of claim 1 wherein the second protocol pursuant to which the second-instance identifier is formatted, comprises a Mobile Application Part (MAP) format.

6. The apparatus of claim 1 wherein the second protocol pursuant to which the second-instance identifier is formatted, comprises a DIAMETER format.

7. The apparatus of claim 1, wherein said protocol converter comprises a Session Initiation Protocol (SIP) Application Server.

8. The apparatus of claim 1 wherein said forwarder comprises a Session Initiation Protocol (SIP) application server.

9. The apparatus of claim 1 further comprising an instance identifier checker configured to determine whether the instance identifier comprises a valid value.

10. A method for facilitating access to a network database node in an Internet Protocol Multimedia Subsystem (IMS) mobile network, said method comprising the operations of:

receiving at an IMS mobile-network application server a user equipment (UE)- originated message pursuant to a mobility related event;

determining if a preconfigured information requires a UE check for the mobility related event;

checking whether the UE-originated message includes a first-instance identifier of a UE, the first-instance identifier comprising information of the UE that uniquely identifies the UE, the first-instance identifier being provided by the UE pursuant to the mobility-related event and formatted pursuant to a first protocol; and when the mobility related event requires the UE check and the UE-originated message includes the first-instance identifier, said application server initiates the UE check with an Equipment Identity Register (EIR);

converting at the IMS mobile-network application server the UE-originated message into a mobility related event message containing a second-instance identifier, the second-instance identifier comprising the first-instance identifier encoded as a uniform resource name; and forwarding from the IMS mobile network application server the mobility related event message containing the second-instance identifier, on to the EIR, whereby the EIR decides whether the mobility-related event is to be permitted.

11. The method of claim 10 wherein the first-instance identifier comprises a value of International Mobile Equipment Identity (IMEI).

12. The method of claim 10 wherein the first-instance identifier is provided pursuant to a third-party registration process.

13. The method of claim 10 wherein the first-instance identifier is provided pursuant to a registration event.

14. The method of claim 10 wherein the first protocol pursuant to which the first-instance identifier is formatted comprises a Session Initiation Protocol (SIP).

15. The method of claim 10 wherein the second protocol pursuant to which the second-instance identifier is formatted, comprises a Mobile Application Part (MAP) format.

16. The method of claim 10 wherein the second protocol pursuant to which the second-instance identifier is formatted, comprises a DIAMETER format.

17. The method of claim 10 wherein the first -instance identifier is provided by way of a radio air interface and a Common Session Control Function (S-CSCF).

18. The method of claim 10 wherein said operation of converting is performed at a Session Initiation Protocol (SIP) application server.

* * * * *